US012750467B2

(12) United States Patent
Chen et al.

(10) Patent No.: US 12,750,467 B2
(45) Date of Patent: Sep. 29, 2026

(54) FOCUS ADJUSTMENT METHOD

(71) Applicant: Coretronic Corporation, Hsin-Chu (TW)

(72) Inventors: Kun-Hong Chen, Hsin-chu (TW); Po-Yen Wu, Hsin-chu (TW); Yu-Hsuan Hsieh, Hsin-chu (TW)

(73) Assignee: Coretronic Corporation, Hsin-Chu (TW)

( * ) Notice: Subject to any disclaimer, the term of this patent is extended or adjusted under 35 U.S.C. 154(b) by 1014 days.

(21) Appl. No.: 17/953,334

(22) Filed: Sep. 27, 2022

(65) Prior Publication Data

US 2023/0102421 A1 Mar. 30, 2023

(30) Foreign Application Priority Data

Sep. 29, 2021 (CN) .......................... 202111149523.9

(51) Int. Cl.
*H04N 9/31* (2006.01)

(52) U.S. Cl.
CPC ................................. *H04N 9/3194* (2013.01)

(58) Field of Classification Search
None
See application file for complete search history.

(56) References Cited

U.S. PATENT DOCUMENTS

2019/0204423 A1* 7/2019 O'Keeffe ................ G01S 17/89
2020/0310230 A1* 10/2020 Liu ........................ H04N 9/315

FOREIGN PATENT DOCUMENTS

| | | |
|---|---|---|
| CN | 106131521 | 11/2016 |
| CN | 107885023 | 4/2018 |
| CN | 109596091 | 4/2019 |
| CN | 111766596 | 10/2020 |
| JP | 2005031205 | 2/2005 |
| TW | I703400 | 9/2020 |

OTHER PUBLICATIONS

"Office Action of China Counterpart Application", issued on Sep. 28 2024, p. 1-p. 9.
"Office Action of China Counterpart Application", issued on Apr. 19, 2024, p. 1-p. 9.

* cited by examiner

*Primary Examiner* — Toan Ton
*Assistant Examiner* — Danell L Owens
(74) *Attorney, Agent, or Firm* — JCIPRNET

(57) ABSTRACT

A focus adjustment method, adapted for a projection system is provided. The projection system includes a projection target and a projection device having a range-finding array element and a processor. A plurality of range-finding elements in the range-finding array element define a plurality of measurement mesh points. The focus adjustment method includes the following. A plurality of ranging regions in the measurement mesh points are defined, and each ranging region includes more than one measurement mesh point. All the range-finding elements in the ranging regions perform a ranging measurement to generate a plurality of original ranging values. An averaging calculation is performed on the original ranging values corresponding to each ranging region to generate a plurality of average region ranging values. Whether the average region ranging values are within a preset range is determined to generate an optimal ranging value which is used to adjust a lens focus.

17 Claims, 5 Drawing Sheets

FOCUS ADJUSTMENT METHOD

CROSS-REFERENCE TO RELATED APPLICATION

This application claims the priority benefit of China application serial no. 202111149523.9, filed on Sep. 29, 2021. The entirety of the above-mentioned patent application is hereby incorporated by reference herein and made a part of this specification.

BACKGROUND

Technical Field

The invention relates to a focus adjustment method, and in particular to a focus adjustment method for adjusting a lens focus of a projection device for a projection target.

Description of Related Art

Projectors currently on the market generally have electronic focus adjustment functions, including power focus and auto focus. Generally, the auto focus of the electronic focus adjustment functions includes the method of image recognition and the method of range-finding and zooming.

Image recognition for auto focus requires a fixed image. For example, an image displayed by a user is covered by a picture with interlaced light and dark color blocks, and color block recognition is conducted for focusing. However, since the above method takes a long time, the user may have missed the image. Furthermore, the image recognition and the keystone correction are often executed at the same time, and the sensitivity of the recognition is not high. Repeated operations of the focus adjustment may affect user experience. If a camera resolution is reduced due to cost considerations, the accuracy of the focus adjustment is greatly reduced.

On the other hand, when the method of the range-finding and zooming is executed for auto focus, a range-finding element disposed in a projector is used to perform time of flight (TOF) measurement on a center point of a projection surface. However, when the requirement of the environment for the projector are not strict, for example, when the projection surface is uneven, focus failure is likely to be caused, which limits the installing position of the projector. Moreover, due to the amount of errors of the range-finding element itself, an appropriate focal position cannot be ensured when projecting at short distance (for example, within one meter), thereby reducing the range of auto zooming.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a projection system and an image projection method that automatically adjust a lens focus of a projection device using area scanning.

In order to achieve one or part or all of the above-mentioned purposes or other purposes, an embodiment of the invention proposes a focus adjustment method, which is adapted for a projection system. The projection system includes a projection target and a projection device. The projection device has a range-finding array element and a processor. The range-finding array element is electrically connected to the processor. The range-finding array element includes a plurality of range-finding elements, and the range-finding elements respectively define a plurality of measurement mesh points on the projection target. The focus adjustment method includes the following. A plurality of ranging regions are defined from the measurement mesh points; and each of the ranging regions includes more than one measurement mesh point. All the corresponding range-finding elements in the ranging regions are enabled to perform a ranging measurement on the projection target to generate a plurality of original ranging values. An averaging calculation is performed on the original ranging values corresponding to each of the ranging regions to generate a plurality of average region ranging values. Whether the average region ranging values are within a preset range is determined to generate an optimal ranging value, and a lens focus of the projection device is adjusted according to the optimal ranging value.

Based on the above, the embodiment of the invention has at least one advantage or efficacy as stated below. In the focus adjustment method of the embodiment of the invention, ranging regions are generated by area scanning, an averaging calculation is performed on a plurality of original ranging values generated by each ranging region, and whether a plurality of average ranging values are within a preset range is determined to generate an optimal ranging value. The error of the range-finding element itself and the error caused by the unevenness of the projection surface are eliminated, and the situation of shaking or displacement of the projector or the projection target itself can be determined, thereby increasing the scope of application and improving user experience.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "Coupled," and "mounted," and variations thereof herein are used broadly and encompass direct and indirect connections, couplings, and mountings.

Figure 1A:
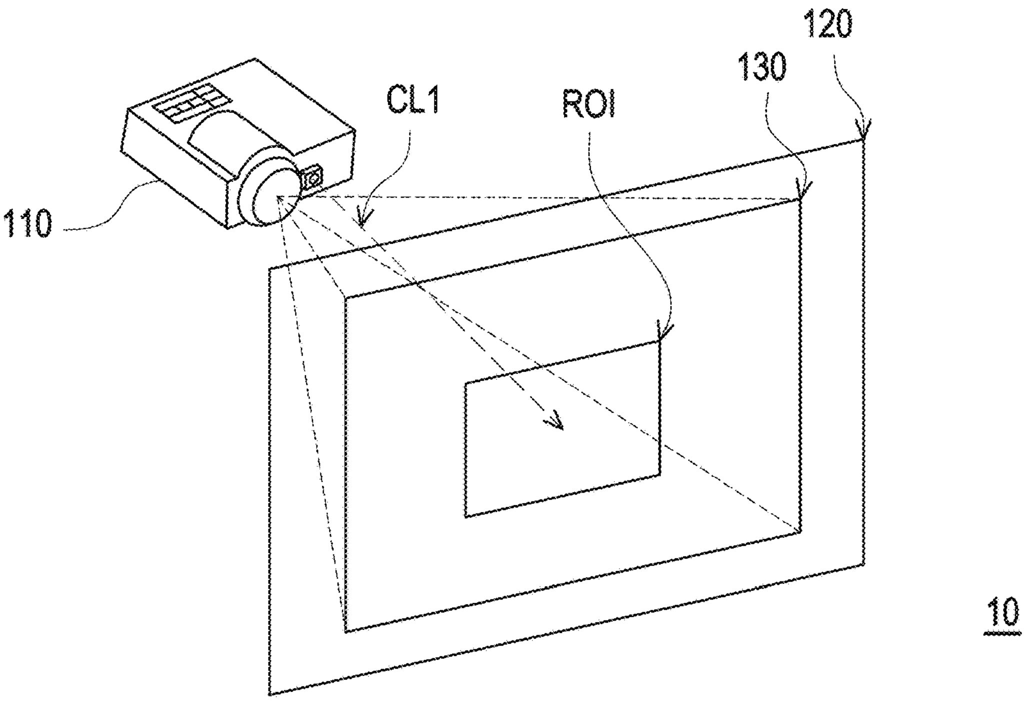
FIGS. 1A and 1B illustrate schematic views of a projection system according to an embodiment of the invention.
Figure 1B:
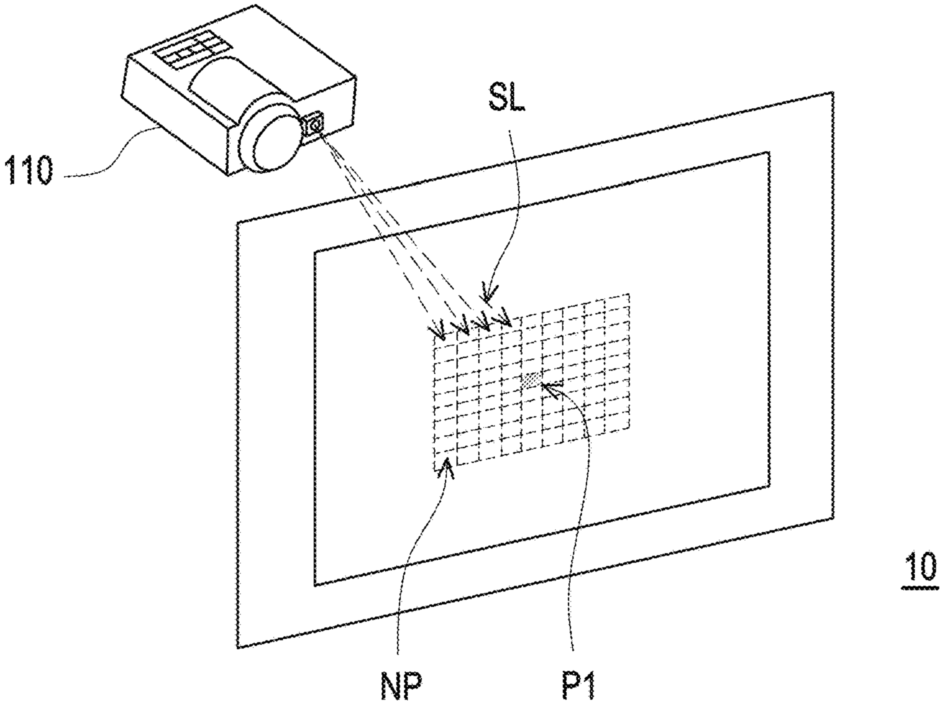
Figure 2:
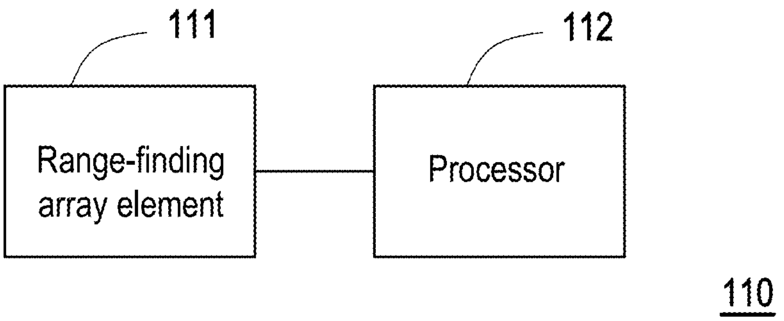
FIG. 2 illustrates a schematic diagram of a projection device according to an embodiment of the invention.
Figure 4:
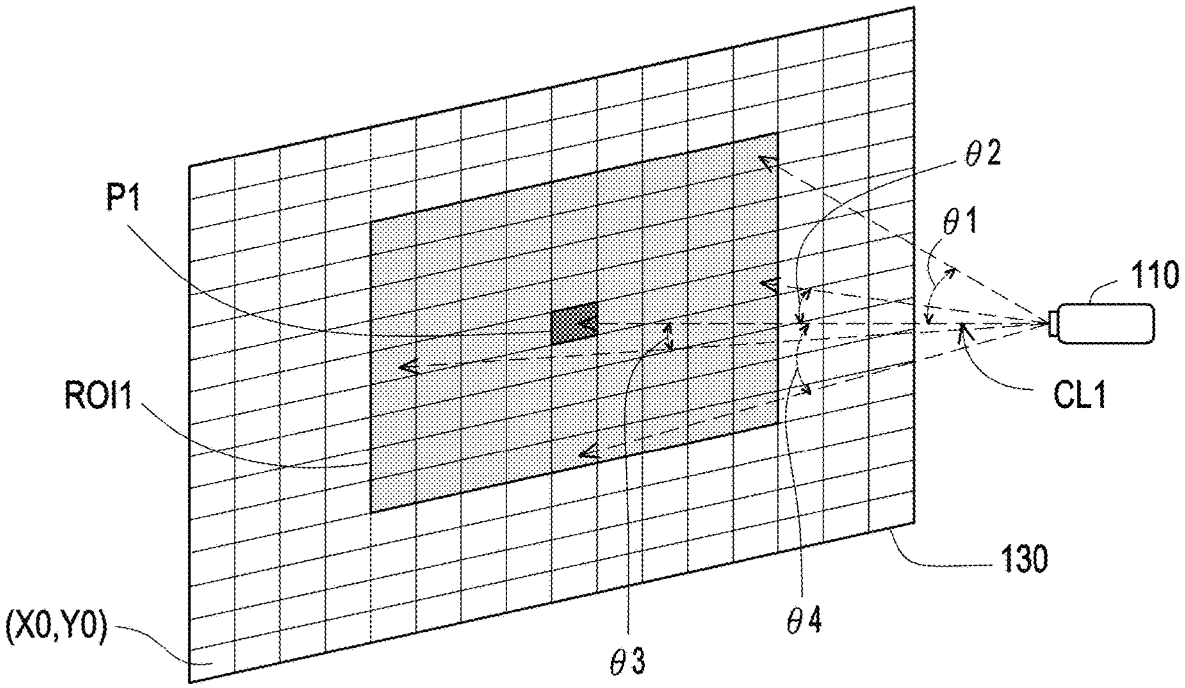
FIG. 4 illustrates a schematic view of performing ranging measurement on a ranging region ROI1 according to an embodiment of the invention.

FIGS. 1A and 1B illustrate schematic views of a projection system according to an embodiment of the invention. FIG. 2 illustrates a schematic diagram of a projection device according to an embodiment of the invention. FIG. 4 illustrates a schematic view of performing ranging on a ranging region ROI1 according to an embodiment of the invention.

Referring to FIGS. 1A, 1B, 2 and 4, a projection system 10 of this embodiment includes a projection device 110 and a projection target 120. The projection device 110 includes a range-finding array element 111 and a processor 112, and the range-finding array element 111 is electrically connected to the processor 112. The projection device 110 is used to project an image within an image display region 130 formed on the projection target 120.

A scanning range (measurement range) of the range-finding array element 111 on the projection target 120 may be a ranging region ROI less than or equal to the image display region 130. It must be noted that the location of the ranging region ROI in FIGS. 1A and 1B is only for illustration, and the scanning range of the range-finding array element 111 on the projection target 120 is not limited to the ranging region ROI shown in FIGS. 1A and 1B, and the number of ranging regions ROI is not limited. The range-finding array element 111 includes a plurality of range-finding elements (not shown) for performing a ranging measurement on the projection target 120. In an embodiment, the range-finding element may be a single-photon avalanche diode (SPAD). For example, the range-finding array element 111 may include an array of 256 (16*16) range-finding elements. When all the range-finding elements are activated, corresponding 256 measurement mesh points NP may be defined on the image display region 130 on the projection target 120.

Figure 6:
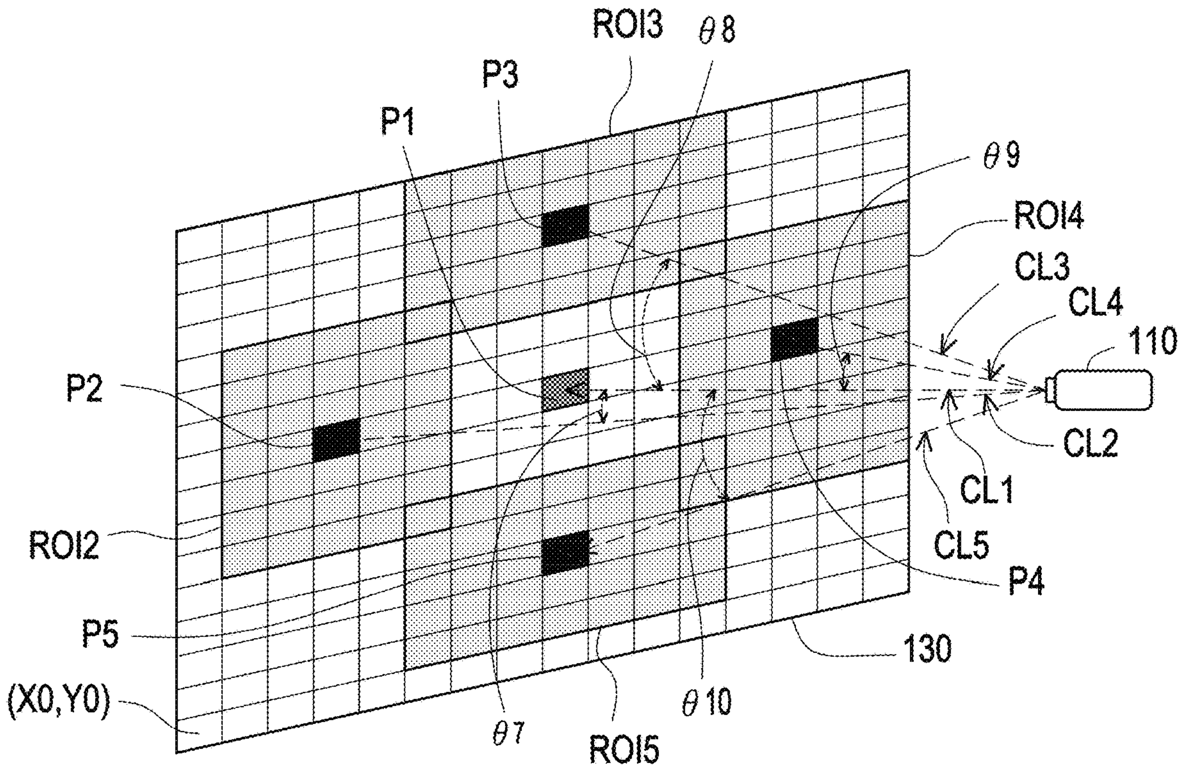
FIG. 6 illustrates a schematic view of performing ranging measurement on ranging regions ROI2 to ROI5 according to an embodiment of the invention.
Figure 7:
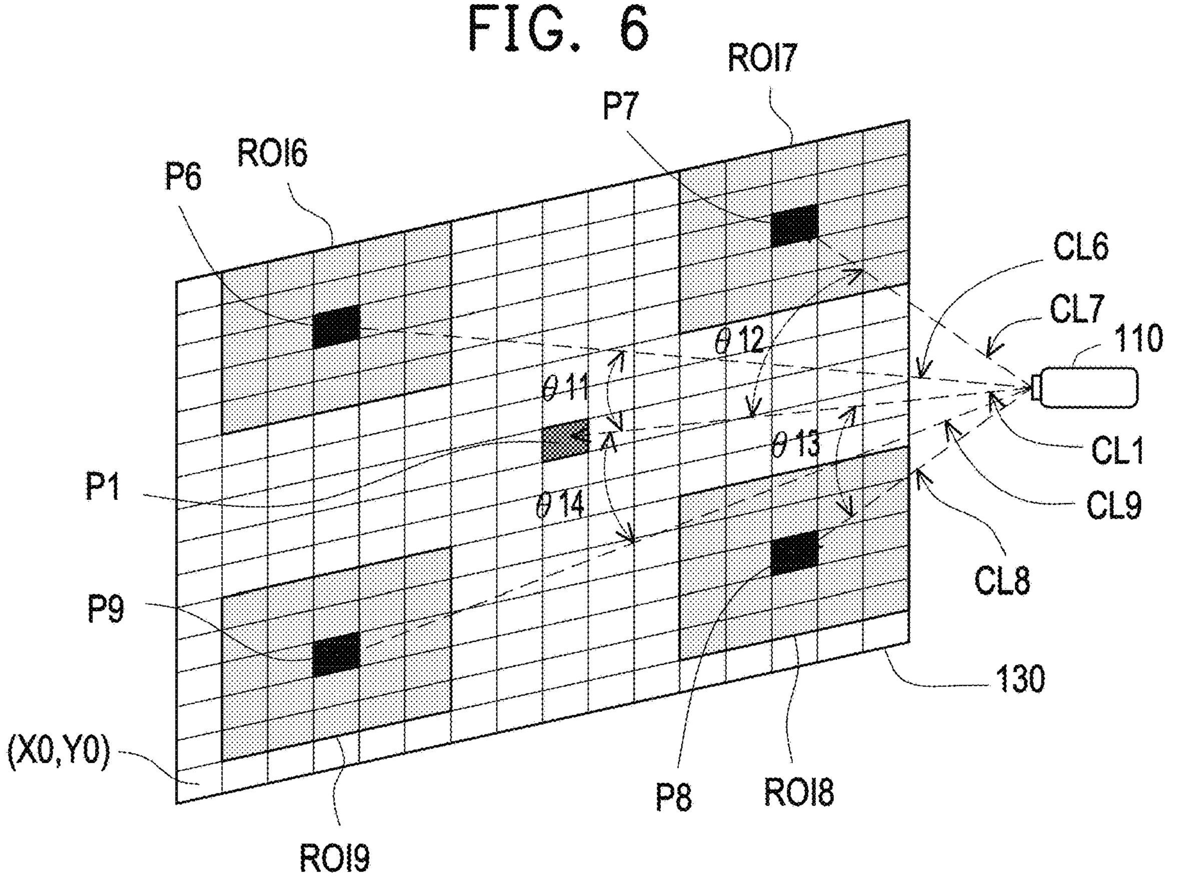
FIG. 7 illustrates a schematic view of performing ranging measurement on ranging regions ROI6 to ROI9 according to an embodiment of the invention.

In an embodiment, the projection device 110 may only activate some of the range-finding elements in the range-finding array element 111 at the same time, so as to define a plurality of measurement mesh points NP on the ranging region ROI on the projection target 120 by respective scan lines SL emitted from the range-finding elements which are activated. For example, as shown in FIG. 1B, one ranging region ROI may include 81 measurement mesh points NP. On the other hand, the plurality of ranging regions ROI may overlap or not overlap each other. Specifically, a part of the measurement mesh points NP of the ranging region ROI may be overlapped (shared) with a part of measurement mesh points NP of the adjacent ranging region ROI, as shown in FIG. 6, and the measurement mesh points NP of the ranging region ROI may be not overlapped (shared) with the measurement mesh points NP of the adjacent ranging region ROI, as shown in FIG. 7. A central measurement mesh point P1 is configured to be located at the center of the image display region 130, and the connecting line between a central range-finding element (not shown) in the range-finding array elements 111 and the central measurement mesh point P1 is a centerline CL1. Furthermore, the connecting line is a transmission path formed by a ranging signal emitted from the range-finding element to the corresponding measurement mesh point.

Moreover, the ranging region ROI usually does not include all 256 (16*16) measurement mesh points NP, because the angle between the connecting line formed by an edge range-finding element in the range-finding array elements and the centerline CL1 is too large, and the measurement result of the edge region corresponding to the edge range-finding element may have a relatively high deviation from the actual distance. As shown in FIGS. 4 to 7, there are 256 measurement mesh points NP on the image display region 130. The ranging regions ROI1 to ROI9 do not include the mesh points from the coordinate point (X0, Y0) to (X15, Y0) on the same row as the coordinate point (X0, Y0) and the mesh points from coordinate point (X0, Y0) to (X0, Y15) on the same column as the coordinate point (X0, Y0) so as to avoid edge out-of-focus phenomenon when a projection surface is an uneven surface.

The processor 112 is used to control the range-finding array element 111, and may perform functions such as selection, enabling, lookup, determination, calculation, comparison, and data processing. In this embodiment, the processor 112 includes, for example, a central processing unit (CPU), a microprocessor, a digital signal processor (DSP), a programmable controller, and a programmable logic device (PLD), or other similar devices or combinations of these devices, and the invention is not limited thereto.

Figure 3:
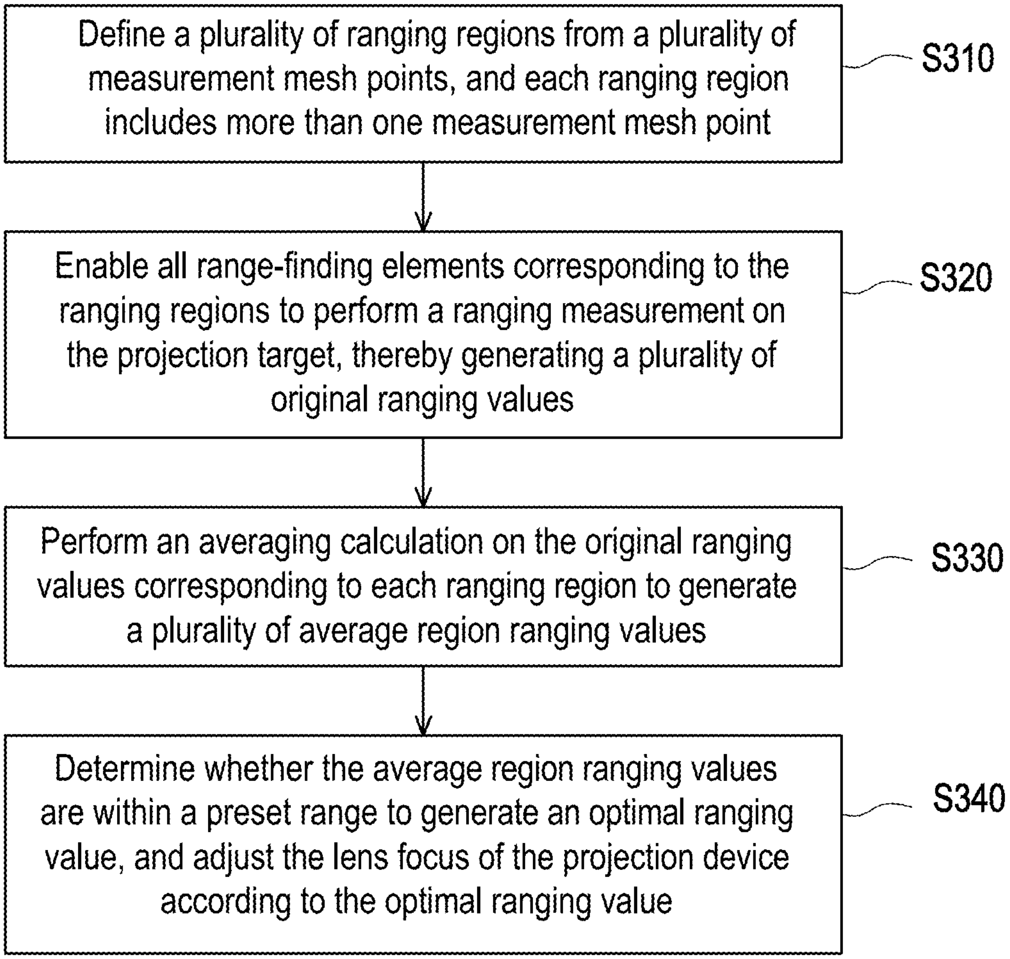
FIG. 3 illustrates a flow chart of a focus adjustment method according to an embodiment of the invention.

FIG. 3 illustrates a flow chart of a focus adjustment method according to an embodiment of the invention. Referring to FIG. 3 and FIGS. 4 to 7 at the same time, in step S310, the projection device 110 defines a plurality of ranging regions ROI from a plurality of measurement mesh points NP, for example, the ranging region ROI1 in FIG. 4, the ranging region ROI2 in FIG. 5, the ranging regions ROI2 to ROI5 in FIG. 6, and the ranging regions ROI6 to ROI9 in FIG. 7. Each ranging region ROI1-ROI9 includes more than one measurement mesh point NP; in other words, each ranging region ROI1-ROI9 includes at least two measurement mesh points NP.

Next, in step S320, the processor 112 enables all range-finding elements corresponding to the plurality of ranging regions ROI to perform a ranging measurement on the projection target 120, thereby generating a plurality of original ranging values. Taking FIG. 4 as an example, the image display region 130 in the projection target 120 defines 256 (16*16) corresponding measurement mesh points NP. The lower left corner point of measurement mesh points NP is the coordinate point (X0, Y0), and the ranging region ROI1 is a rectangular region from the coordinate points (X4, Y4) to (X12, Y12). The processor 112 enables 81 (9*9) corresponding range-finding elements to measure 81 measurement mesh points corresponding to the ranging region ROI1, so as to generate 81 original ranging values. Taking FIG. 5 as an example, the ranging region ROI2 is the rectangular region from the coordinate points (X1, Y5) to (X5, Y11). The processor 112 enables 35 (5*7) corresponding range-finding elements to measure 35 measurement mesh points corresponding to the ranging region ROI2, so as to generate 35 original ranging values. It is worth mentioning that the ranging measurement corresponding to one ranging regions ROI and the next ranging measurement corresponding to another ranging region ROI have a time interval. In an embodiment, the time interval may be set to be the same every time. Taking FIG. 6 as an example, the time interval between the ranging region ROI2 and the ranging region ROI3 is the same as the time interval between the ranging region ROI3 and the ranging region ROI4.

In step S330, an averaging calculation is performed on the plurality of original ranging values corresponding to each ranging region ROI to generate a plurality of average region ranging values. Taking FIG. 4 as an example, an averaging calculation is performed on 81 corresponding original ranging values of the ranging region ROI1 to generate the average region ranging value of the ranging region ROI1, for example, 100 centimeters (cm). Taking FIG. 5 as an example, an averaging calculation is performed on 35 (5*7) corresponding original ranging values of the ranging region ROI2 to generate the average region ranging value of the ranging region ROI2, for example, 102 cm.

Next, in step S340, whether the plurality of average region ranging values are within a preset range is determined to generate an optimal ranging value, and the lens focus of the projection device 110 is adjusted according to the optimal ranging value. The preset range is used to determine whether the average region ranging value is within an allowable range of valid values. The ranging measurement, the averaging calculation, and the determination process of the optimal ranging value will be explained in detail later.

FIG. 4 illustrates a schematic view of performing ranging measurement on the ranging region ROI1 according to an embodiment of the invention. Referring to FIG. 4, in an embodiment, the ranging region ROI1 (that is, the central ranging region in the image display region 130) includes 81 measurement mesh points NP. The connecting line between the central range-finding element (not shown) in the range-finding array element 111 and the central measurement mesh point P1 is the centerline CL1. There are respective preset angles between each of the connecting lines of all range-finding elements and the centerline CL1. Taking FIG. 4 as an example, there is a preset angle θ1 between the connecting line of the range-finding element corresponding to the coordinate point (X12, Y12) and the centerline CL1; there is a preset angle θ2 between the connecting line of the range-finding element corresponding to the coordinate point (X12, Y8) and the centerline CL1; there is a preset angle θ3 between the connecting line of the range-finding element corresponding to the axis coordinate point (X4, Y8) and the centerline CL1; and there is a preset angle θ4 between the connecting line of the range-finding element corresponding to the axis coordinate point (X8, Y4) and the centerline CL1. The preset angle θ1, the preset angle θ2, the preset angle θ3, and the preset angle θ4 are fixed values; for example, the preset angle θ1 may be 20°, the preset angle θ2 may be 10°, the preset angle θ3 may be 15°, and the preset angle θ4 may be 10°. The preset angle corresponding to each range-finding element in the range-finding array element depends on design requirements, and the invention is not limited thereto.

Referring to FIG. 4 and the ranging measurement in step S320 in FIG. 3, in an embodiment, each range-finding element includes a transmitter and a receiver. The processor 112 selects the ranging region ROI1 as a region to be measured among the ranging regions ROI1 to ROI9, enables transmitters corresponding to 81 range-finding elements in the region to be measured (the ranging region ROI1) to emit ranging signals respectively to 81 measurement mesh points NP corresponding to the coordinate point (X4, Y4) to the coordinate point (X12, Y12) of the image display region 130 in the projection target 120. Next, the signal intensity values of 81 reflected ranging signals reflected by the projection target 120 are measured through receivers of 81 range-finding elements in the region to be measured (the ranging region ROI1). The processor 112 receives the signal intensity values of 81 reflected ranging signals measured by the receivers of 81 range-finding elements, and the processor 112 inputs the signal intensity values of the 81 reflected ranging signals into a lookup table to output 81 original ranging values corresponding to the measured 81 reflected ranging signals. The lookup table may be a one-to-one comparison table of the signal intensity values and distances. The lookup table is stored in a storage unit of the projection device 110. The lookup table may be accessed and executed by the processor 112, and the invention is not limited thereto.

Referring to FIG. 4 and the averaging calculation in step S330 in FIG. 3, in an embodiment, the processor 112 determines whether the 81 original ranging values generated by the ranging region ROI1 to be measured are continuous to generate N effective ranging values, where N is less than or equal to 81. The ranging region ROI1 is the region to be measured. Next, the processor 112 performs a trigonometric function calculation and an averaging calculation equivalent to the direction of the centerline CL1 on the N effective ranging values of the ranging region ROI1 according to the respective preset angles of the N effective ranging values to generate the average region ranging value of the ranging region ROI1.

Regarding the step of generating the effective ranging values, first, the processor 112 calculates the difference between the original ranging value corresponding to each range-finding element and the original ranging value corresponding to an adjacent range-finding element. Next, the processor 112 compares each difference with a preset threshold to determine whether the original ranging values are continuous, and calculate a plurality of original ranging values that are determined to be continuous to generate a plurality of effective ranging values. In an embodiment, when the difference between a certain original ranging value and an original ranging value corresponding to an adjacent range-finding element among the 81 original ranging values is less than the preset threshold, the processor 112 determines that the two original ranging values are continuous. On the other hand, when the difference between a certain original ranging value and an original ranging value corresponding to an adjacent range-finding element among the 81 original ranging values is greater than the preset threshold, the processor 112 determines that the two original ranging values are not continuous.

For example, assuming that the five original ranging values generated by five range-finding elements which are disposed in sequence along a direction in the ranging region ROI1 are respectively 102 cm, 103 cm, 80 cm, 101 cm, 104 cm, the difference may be calculated as 1 cm, 23 cm, 21 cm, 3 cm. When the preset threshold is 5 cm, since the difference of 1 cm and 3 cm is less than the preset threshold, and the difference of 23 cm and 21 cm is greater than the preset threshold, the four original ranging values, 102 cm, 103 cm, 101 cm, and 104 cm may be determined to be continuous, and the original ranging value of 80 cm is discontinuous with the rest of the original ranging values. The original ranging value of 80 cm is a value that is deviated too much, which may be caused by the convex surface or the indentation of the projection surface, or signal interference and shaking during the ranging measurement. Therefore, the processor 112 takes the original ranging values of 102 cm, 103 cm, 101 cm, and 104 cm that are determined to be continuous as the effective ranging values. Assuming that 75 effective ranging values are taken among the 81 original ranging values, the processor 112 sums up the 75 effective ranging values and calculate the average; that is, the average value of the 75 effective ranging values are the average region ranging value; for example, the average region ranging value of the ranging region ROI1 is calculated to be 101 cm. The ranging measurement and averaging calculation to other ranging regions are the same, so details thereof will not be repeated herein.

It must be noted that the connecting line between the central range-finding element among a plurality of range-finding elements corresponding to each region to be measured and the corresponding central measurement mesh point on the projection target 120 is used as the region centerline. When the difference between the average region ranging value corresponding to each region to be measured and the ranging value corresponding to the region centerline is less than a preset standard, the region to be measured is determined to be planar. The preset standard is a preset range or a preset value. On the other hand, when the difference is greater than the preset standard, the region to be measured is determined to be nonplanar. For example, the connecting line between the central range-finding element of the ranging region ROI1 and the corresponding central measurement mesh point C1 on the projection target 120 is the centerline CL1. When the ranging region ROI1 is used as the region to be measured, the centerline CL1 may be used as the region centerline of the ranging region ROI1 Assuming that the ranging value corresponding to the centerline CL1 is 100 cm, the average region ranging value of the ranging region ROI1 is 103 cm, and the preset value is 5 cm, the difference between the average region ranging value 103 cm of the ranging region ROI1 and the center single-point ranging value 100 cm corresponding to the centerline CL1 is 3 cm, which is less than the preset value (5 cm). It may be understood that the average region ranging value of the ranging region ROI1 is close to the ranging value corresponding to the central measurement mesh point C1, thereby determining that the ranging region ROI1 on the projection target 120 is a planar surface, not an uneven surface or other nonplanar surfaces.

Figure 5:
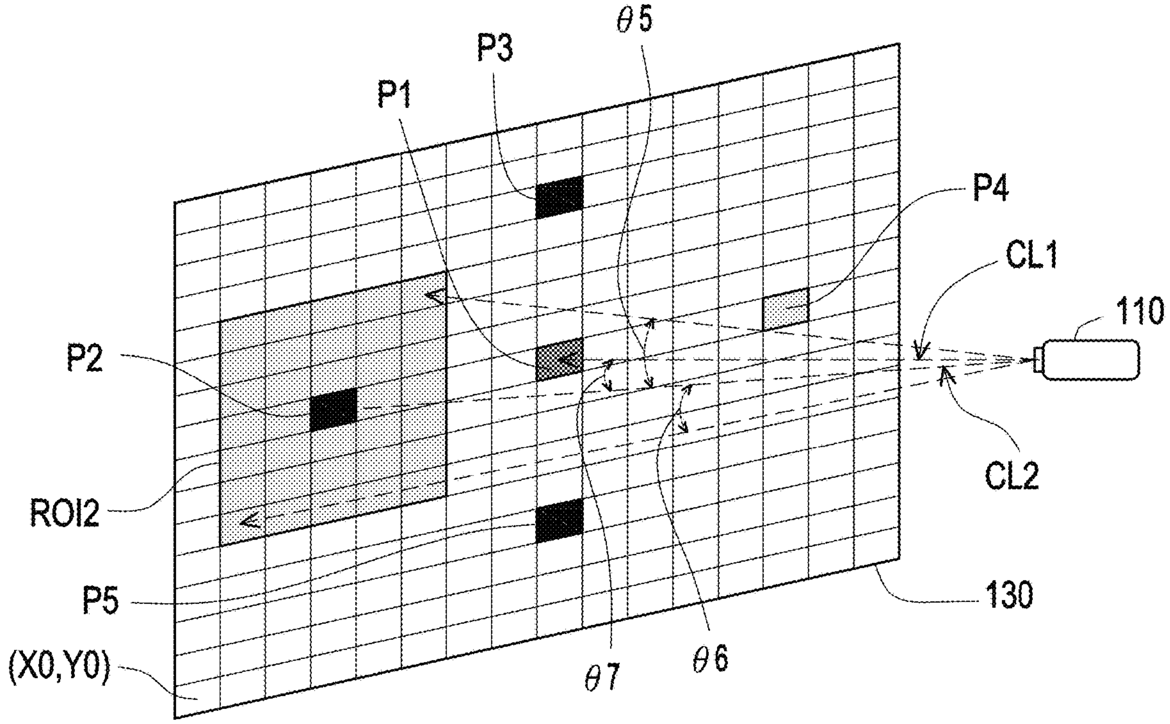
FIG. 5 illustrates a schematic view of performing ranging measurement on a ranging region ROI2 according to an embodiment of the invention.

FIG. 5 illustrates a schematic view of performing ranging measurement on the ranging region ROI2 according to an embodiment of the invention. Referring to FIG. 5, in an embodiment, the ranging region ROI2 is a rectangular region from coordinate points (X1, Y5) to (X6, Y11), and includes 35 measurement mesh points NP. The connecting line between a central measurement mesh point P2 of the ranging region ROI2 and the corresponding range-finding element is a region centerline CL2, and there are respective preset angles between the connecting lines of all range-finding elements corresponding to the ranging region ROI2 and the centerline CL2. Taking FIG. 5 as an example, there is a preset angle θ5 between the connecting line of the range-finding element corresponding to the coordinate point (X5, Y11) and the region centerline CL2, and there is a preset angle θ6 between the connecting line of the range-finding element corresponding to the coordinate point (X1, Y5) and the region centerline CL2. There is a preset angle θ7 between the region centerline CL2 and the centerline CL1.

Central measurement mesh points P3 to P5 respectively correspond to the ranging regions ROI3 to ROI5, as detailed in FIG. 6. The processor 112 enables 35 (5*7) corresponding range-finding elements in the ranging region ROI2 to perform a ranging measurement to generate 35 original ranging values, and performs an averaging calculation on the 35 original ranging values to generate the average region ranging value of the ranging region ROI2. FIG. 4 may be referred to the ranging measurement and the averaging calculation of the ranging region ROI2, and details thereof will not be repeated herein. As in FIG. 4, the processor 112 compares the difference between the average region ranging value of the ranging region ROI2 and the ranging value corresponding to the region centerline CL2 with the preset value or range corresponding to the ranging region ROI2 to determine whether the ranging region ROI2 on the projection target 120 is planar. It must be noted that the above-mentioned average region ranging value of the ranging region ROI2 has taken into account the preset angle θ7 and is equivalent to corresponding to the direction of the centerline CL1 through the trigonometric function calculation.

FIG. 6 illustrates a schematic view of performing ranging measurement on the ranging regions ROI2 to ROI5 according to an embodiment of the invention. Referring to FIG. 6, the ranging region ROI2 is shown in FIG. 5. The ranging regions ROI3 to ROI5 are rectangular regions which respectively include 35 measurement mesh points NP. The connecting line between the central measurement mesh point P3 of the ranging region ROI3 and the corresponding range-finding element is a region centerline CL3, and there is a preset angle θ8 between the region centerline CL3 and the centerline CL1. The connecting line between the central measurement mesh point P4 of the ranging region ROI4 and the corresponding range-finding element is a region centerline CL4, and there is a preset angle θ9 between the region centerline CL4 and the centerline CL1. The connecting line between the central measurement mesh point P5 of the ranging region ROI5 and the corresponding range-finding element is a region centerline CLS, and there is a preset angle θ10 between the region centerline CL5 and the centerline CL1. The processor 112 enables the 35 corresponding range-finding elements respectively in each of the ranging regions ROI2 to ROI5 to perform a ranging measurement to respectively generate 35 original ranging values, and performs an averaging calculation on the 35 original ranging values respectively to generate the average region ranging value of each of the ranging regions ROI2 to ROI5. FIG. 4 is referred to the ranging measurement and the averaging calculation of the ranging regions ROI2 to ROI5, and details thereof will not be repeated herein. As in FIG. 4, the processor 112 respectively compares the difference between the average region ranging values of the ranging regions ROI2 to ROI5 and the ranging values corresponding to the region centerlines CL2 to CL5 with the preset standards corresponding to the ranging regions ROI2 to ROI5 to determine whether the ranging regions ROI2 to ROI5 are planar on the projection target 120. It must be noted that the above-mentioned average region ranging values of the ranging regions ROI2 to ROI5 have taken into account the preset angles θ7 to θ10 and are equivalent to corresponding to the direction of the centerline CL1 through the trigonometric function calculation.

FIG. 7 illustrates a schematic view of performing ranging measurement on the ranging regions ROI6 to ROI9 according to an embodiment of the invention. Referring to FIG. 7, the ranging regions ROI6 to ROI9 are rectangular regions which respectively include 25 (5*5) measurement mesh points NP. The connecting line between a central measurement mesh point P6 of the ranging region ROI6 and the corresponding range-finding element is a region centerline CL6, and there is a preset angle θ11 between the region centerline CL6 and the centerline CL1. The connecting line between a central measurement mesh point P7 of the ranging region ROI7 and the corresponding range-finding element is a region centerline CL7, and there is a preset angle θ12 between the region centerline CL7 and the centerline CL1. The connecting line between a central measurement mesh point P8 of the ranging region ROI8 and the corresponding range-finding element is a region centerline CL8, and there is a preset angle θ13 between the region centerline CL8 and the centerline CL1. The connecting line between a central measurement mesh point P9 of the ranging region ROI9 and the corresponding range-finding element is a region centerline CL9, and there is a preset angle θ14 between the region centerline CL9 and the centerline CL1. The processor 112 enables 25 corresponding range-finding elements in each of the ranging regions ROI6 to ROI9, respectively, to perform a ranging measurement to generate 25 original ranging values, and performs an averaging calculation on the 25 original ranging values, respectively, to generate the average region ranging values of the ranging regions ROI6 to ROI9. FIG. 4 is referred to the ranging measurement and averaging calculation of the ranging regions ROI6 to ROI9, and details thereof will not be repeated herein. As in FIG. 4, the processor 112 respectively compares the difference between the average region ranging values of the ranging regions ROI6 to ROI9 and the center single-point ranging values corresponding to the region centerlines CL6 to CL9 with the preset standards corresponding to the ranging regions ROI6 to ROI9 to determine whether the ranging regions ROI6 to ROI9 are planar on the projection target 120. The preset standards of the ranging regions ROI1 to ROI9 may be the same or different, depending on the design requirements. It must be noted that the above-mentioned average region ranging values of the ranging regions ROI6 to ROI9 have taken into account the preset angles θ11 to θ14 and are equivalent to corresponding to the direction of the centerline CL1 through the trigonometric function calculation.

Figure 8:
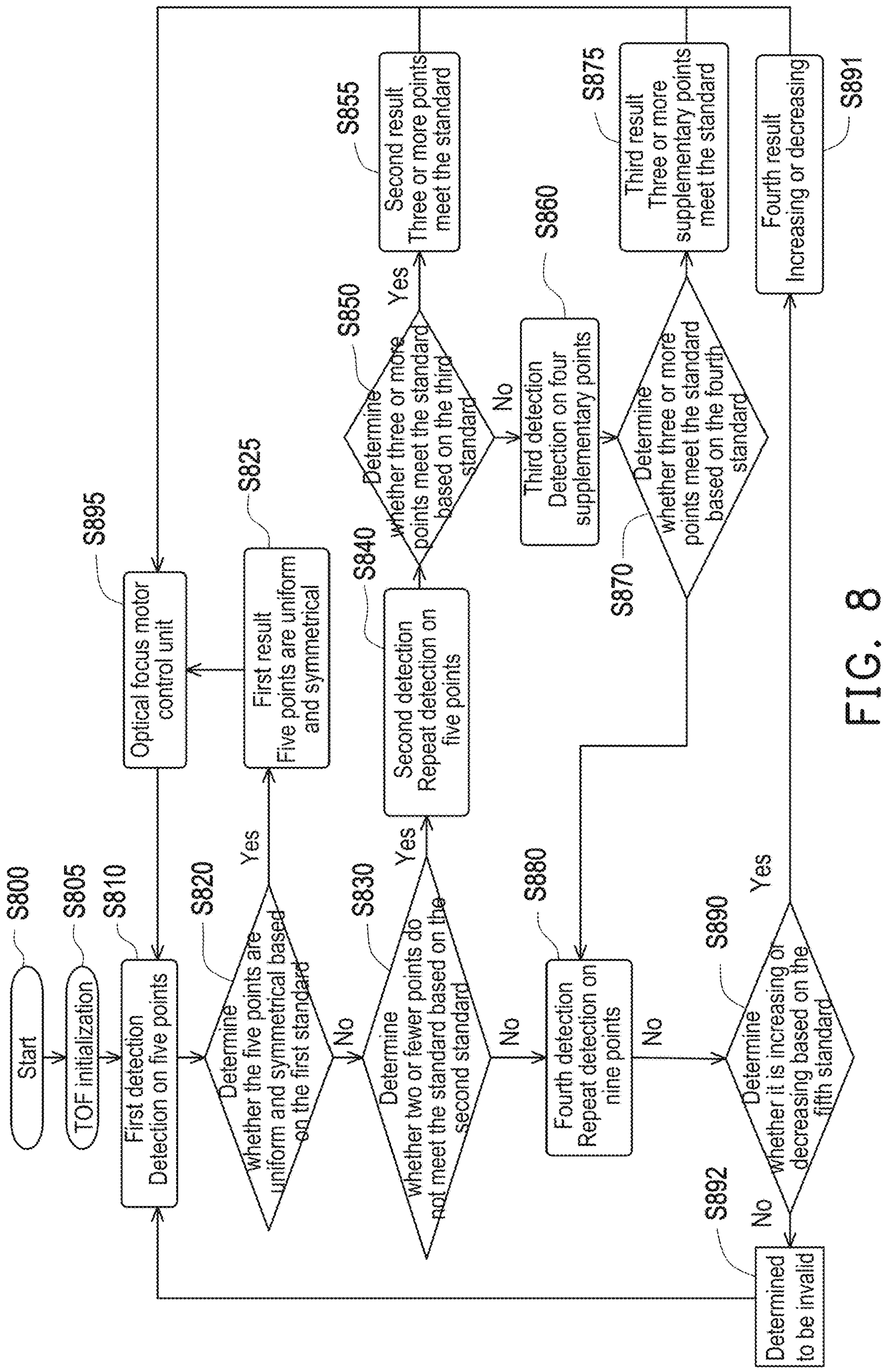
FIG. 8 illustrates a flow chart of determining an optimal ranging value according to an embodiment of the invention.

FIG. 8 illustrates a flow chart of determining an optimal ranging value according to an embodiment of the invention. Referring to FIG. 8, in step S800, the projection device 110 starts to perform focus adjustment. In step S805, the projection device 110 performs time of flight (TOF) initialization, for example, turning off all range-finding elements in the range-finding array element 111, and initializes various calculation data related to focus adjustment in the processor 112.

In step S810, the projection device 110 performs a first detection. The first detection is the ranging measurement and the averaging calculation of each of the ranging regions ROI1 to ROI5 in FIGS. 4 to 6, so as to respectively generate the average region ranging values of the ranging regions ROI1 to ROI5.

In step S820, the processor 112 performs a first standard determination. In the first standard determination, the processor 112 determines whether the average region ranging values of the ranging regions ROI1 to ROI5 are all within the preset range. In an embodiment, if the actual ranging value corresponding to the central measurement mesh point P1 and the centerline CL1 is 100 cm, assuming that the preset range is plus or minus 3 cm, if the actual average region ranging value corresponding to the ranging region ROI and the equivalent average region ranging values corresponding to the ranging regions ROI2 to ROI5 are all within 97-103 cm, it is determined that the average region ranging values of the ranging regions ROI1 to ROI5 are within the preset range, and goes to step S825. Otherwise, it is determined that the average region ranging values of the ranging regions ROI1 to ROI5 are not all within the preset range, and goes to step S830.

In step S825, when the average region ranging values of the ranging regions ROI1 to ROI5 are all within the preset range, the average region ranging value of the central ranging region (that is, the ranging region ROI1) is taken as the optimal ranging value. The central ranging region (that is, the ranging region ROI1) is at the center of the ranging regions ROI2 to ROI5. The ranging regions ROI2 to ROI5 may be disposed around the central ranging region (that is, the ranging region ROI1). Specifically, if the actual ranging value corresponding to the central measurement mesh point P1 and the centerline CL1 is 100 cm, assuming that the preset range is plus or minus 3 cm, when the actual ranging values of the ranging regions ROI1 to ROI5 are all within 97 to 103 cm, it may be determined that the five points of the central measurement mesh points P1 to P5 are uniform and symmetrical, and the image display region 130 of the projection target 120 may be regarded as a planar surface. Therefore, the average region ranging value of the central ranging region (that is, the ranging region ROI1) is taken as the optimal ranging value. For example, the actual ranging value of 100 cm of the ranging region ROI1 is taken as the optimal ranging value of the projection device 110 to the projection target 120. Therefore, the actual ranging value of 100 cm of the ranging region ROI1 is a first result in step S825, and the processor 112 provides the first result to an optical focus motor control unit (not shown) in step S895. In an embodiment, the optical focus motor control unit is included in the projection device 110 to dynamically adjust the lens focus of the projection device 110 according to the ranging result (that is, the optimal ranging value), so as to realize auto focus.

In step S830, when the average region ranging values of the ranging regions ROI1 to ROI5 are not all within the preset range, a second standard determination is performed. In the second standard determination, the processor 112 determines whether one or two of the average region ranging values of the ranging regions ROI1 to ROI5 are out of the preset range. In an embodiment, if the processor 112 determines that only one or two of the ranging regions ROI1 to ROI5 do not meet the preset range, that is, two or less of the central measurement mesh points CL1 to CL5 do not meet the preset range, then goes to step S840. If the processor 112 determines that the number of ranging regions ROI1 to ROI5 that do not meet the preset range is not two or less, for example, three or more central measurement mesh points do not meet the preset range, then goes to step S880.

In step S840, the projection device 110 performs a second detection, and the second detection includes repeating the ranging measurement and the averaging calculation on the ranging regions ROI1 to ROI5 several times to respectively generate multiple sets of the average region ranging values of the ranging regions ROI1 to ROI5.

In step S850, the processor 112 performs a third standard determination. In the third standard determination, the processor 112 determines whether there is a set of results where at least three average region ranging values of the ranging regions ROI1 to ROI5 are all within the preset range based on the multiple sets of results generated in step S840. The determination method and the preset range are as mentioned above, and details thereof will not be repeated herein. When the processor 112 determines that at least three average region ranging values of the ranging regions ROI1 to ROI5 are all within the preset range, step S855 is proceeded to. When the processor 112 determines that at least three average region ranging values of the ranging regions ROI1 to ROI5 are not all within the preset range, goes to step S860.

In step S855, the processor 112 takes the average of the at least three average region ranging values that are all in the preset range in step S840 as the optimal ranging value. For example, the equivalent average region ranging values of the ranging regions ROI2, ROI3, and ROI4, respectively, are 102, 103, 98 cm, and the average of the average region ranging values of the ranging regions ROI2, ROI3, and ROI4 is 101 cm, which is used as the optimal ranging value of the projection device 110 to the projection target 120. Therefore, the average value of 101 cm of the average region ranging values of the ranging regions ROI2, ROI3, and ROI4 is a second result in step S855, and the processor 112 provides the second result to the optical focus motor control unit in step S895.

In step S860, the projection device 110 performs a third detection. The third detection includes repeating the ranging measurement and the averaging calculation on the ranging regions ROI6 to ROI9 (that is, supplementary ranging regions) of the non-ranging regions ROI1 to ROI5 to respectively generate multiple sets of average region ranging values of the ranging regions ROI6 to ROI9.

In step S870, the processor 112 performs a fourth standard determination. In the fourth standard, the processor 112 determines whether at least three average region ranging values of the central ranging region (the ranging region ROI1) and the supplementary ranging regions (the ranging regions ROI6 to ROI9) are all within the preset range of the supplementary ranging regions based on the average region ranging values of the ranging regions ROI6 to ROI9 (that is, the supplementary ranging regions). The determination method and the preset range of the supplementary ranging regions are as described above, and details thereof will not be repeated herein. When at least three average region ranging values of the central ranging region (the ranging region ROI1) and the supplementary ranging regions (the ranging regions ROI6 to ROI9) are all within the preset range of the supplementary ranging regions, step S875 is proceeded to. When at least three average region ranging values of the central ranging region (the ranging region ROI1) and the supplementary ranging regions (the ranging regions ROI6 to ROI9) are not all within the preset range of the supplementary ranging regions, step S880 is proceeded to.

In step S875, the average of at least three average region ranging values of the central ranging region (the ranging region ROI1) and the supplementary ranging regions (the ranging regions ROI6 to ROI9) respectively within the preset ranges of the central ranging region and the supplementary ranging regions is taken and used as the optimal ranging value. For example, the equivalent average region ranging values of the ranging regions ROI6, ROI7, and ROI9 are, respectively, 98, 99, and 100 cm (assuming that they are all within the preset range of the supplementary ranging region), the average of the average region ranging values of the ranging regions ROI6, ROI7, and ROI9, 99 cm, is taken as the optimal ranging value of the projection device 110 to the projection target 120, the average of the average region ranging values of the ranging regions ROI6, ROI7, and ROI9, 99 cm, is a third result in step S875, and the third result is provided to the optical focus motor control unit in step S895.

In step S880, the projection device 110 performs a fourth detection. The fourth detection includes the projection device 110 repeating the ranging measurement and the averaging calculation on the ranging regions ROI1 to ROI9 several times to respectively generate multiple sets of average region ranging values of the ranging regions ROI1 to ROI9.

Next, in step S890, the processor 112 performs a fifth standard determination. In the fifth standard determination, the processor 112 determines whether multiple sets of the average region ranging values of the ranging regions ROI1 to ROI9 are increasing or decreasing over time toward a specific direction. If the average region ranging values of the ranging regions ROI1 to ROI9 are increasing or decreasing toward the X axis of FIG. 7 over time, it may be determined that the projection device 110 or the projection target 120 is undergoing directional displacement, and goes to step S891. If the average region ranging values of the ranging regions ROI1 to ROI9 are not increasing or decreasing toward a specific direction over time, goes to step S892.

In step S891, the processor 112 takes the average of the average region ranging values that are determined to be increasing or decreasing in a specific direction over time as a tentative ranging value. For example, when the average region ranging value of the ranging region ROI2 is increasing over time toward the X direction, for example, 98, 99, 100, 101, 102 cm, the average of the average region ranging values of the region ROI2 with increasing values, 100 cm, is used as the tentative ranging value, that is, a fourth result. The fourth result is provided to the optical focus motor control unit in step S895. In step S892, the processor 112 determines that the current area measurement result is invalid, and the processor 112 does not take the optimal ranging value and the tentative ranging value, and returns to step S810 to perform focus adjustment again.

In summary, the embodiment of the invention has at least one advantage or efficacy as stated below. In the embodiment of the invention, ranging regions are generated by area scanning; an averaging calculation is performed on a plurality of original ranging values generated by each ranging region; and whether a plurality of average ranging values are within the preset range is determined to generate the optimal ranging value. The error of the range-finding element itself and the error caused by the unevenness of the projection surface may be eliminated, and the effective ranging value determination and repeated detection mechanism are used in the process. Therefore, the measurement error caused by weak signal interference of single-point ranging is significantly reduced, and the situation of shaking or displacement of the projector or the projection target itself can be determined, thereby expanding the scope of application of auto focus. In addition, the operation of the invention does not need to be repeated, which may improve user experience. The invention may also activate by partition or activate only a part of the range-finding elements at a time, thereby the detection time is reduced. Furthermore, the invention adopts multi-point ranging. Compared with single-point ranging, the invention may determine irregular projection surfaces, abandon non-flattened partial ranging measurements while avoiding obstacles, and count the average region ranging values of the supplementary ranging regions, so as to improve the calculation accuracy of the optimal ranging value (depth of field distance) and the image quality of the projection image.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A focus adjustment method, adapted for a projection system, wherein the projection system comprises a projection target and a projection device having a range-finding array element and a processor, the range-finding array element is electrically connected to the processor, the range-finding array element comprises a plurality of range-finding elements and the range-finding elements respectively define a plurality of measurement mesh points on the projection target, and the focus adjustment method comprises:

defining a plurality of ranging regions from the measurement mesh points, wherein each of the ranging regions comprises more than one measurement mesh point;

enabling all the corresponding range-finding elements in each of the ranging regions to perform a ranging measurement on the projection target to generate a plurality of original ranging values, wherein the ranging measurements corresponding to the ranging regions are sequentially performed and a time interval between every one of the ranging measurements corresponding to the ranging regions is set to be the same;

performing an averaging calculation on the original ranging values corresponding to each of the ranging regions to generate a plurality of average region ranging values; and determining whether the average region ranging values are within a preset range to generate an optimal ranging value, and adjusting a lens focus of the projection device according to the optimal ranging value.

2. The focus adjustment method according to claim 1, wherein enabling all the corresponding range-finding elements in the ranging regions to perform the ranging measurement on the projection target to generate the original ranging values comprises:

selecting a part of the ranging regions among the ranging regions as a region to be measured;

enabling a plurality of transmitters corresponding to all the range-finding elements in the region to be measured to transmit a plurality of ranging signals to the projection target, wherein the transmitters transmit the ranging signals to the measurement mesh points corresponding to the range-finding elements on the projection target;

measuring a plurality of reflected ranging signals reflected by the projection target through a plurality of receivers corresponding to all the range-finding elements in the region to be measured; and inputting the reflected ranging signals into a lookup table to output the original ranging values corresponding to the reflected ranging signals.

3. The focus adjustment method according to claim 2, wherein performing the averaging calculation on the original ranging values corresponding to each of the ranging regions to generate the average region ranging values comprises:

determining whether the original ranging values generated by each of the ranging regions in the region to be measured are continuous to generate a plurality of effective ranging values; and performing a trigonometric function calculation and an average calculation equivalent to a direction of the centerline on the effective ranging values of each of the ranging regions in the region to be measured to generate the average region ranging values according to a preset angle respectively between the connecting line of all the range-finding elements and a centerline of the range-finding array element.

4. The focus adjustment method according to claim 3, wherein determining whether the original ranging values generated by each of the ranging regions in the region to be measured are continuous to generate the effective ranging values comprises:

calculating a difference between the original ranging value corresponding to each of the range-finding elements and the original ranging value corresponding to the adjacent range-finding element;

comparing the difference with a preset threshold to determine whether the original ranging values are continuous; and taking the original ranging value determined to be continuous among the original ranging values to generate the effective ranging values.

5. The focus adjustment method according to claim 4, wherein when the difference between one of the original ranging values and the original ranging value corresponding to the adjacent range-finding element is less than the preset threshold, it is determined that one of the original ranging values is continuous, when the difference between one of the original ranging values and the original ranging value corresponding to the adjacent range-finding element is greater than the preset threshold, it is determined that one of the original ranging values is not continuous.

6. The focus adjustment method according to claim 1, wherein the ranging regions overlap each other.

7. The focus adjustment method according to claim 1, wherein the ranging regions do not overlap each other.

8. The focus adjustment method according to claim 1, wherein the range-finding elements are single photon avalanche diodes.

9. The focus adjustment method according to claim 1, wherein determining whether the average region ranging values are within the preset range to generate the optimal ranging value comprises:

determining whether the average region ranging values are all within the preset range.

10. The focus adjustment method according to claim 9, wherein, when the average region ranging values are all within the preset range, the average region ranging value of a central ranging region is taken as the optimal ranging value, wherein the central ranging region is at a center of the ranging regions, and when the average region ranging values are not all within the preset range, whether one or two average region ranging values among the average region ranging values are out of the preset range is determined.

11. The focus adjustment method according to claim 10, further comprising:

when the one or two average region ranging values among the average region ranging values are out of the preset range, the ranging measurement and the averaging calculation are repeated on the ranging regions, and whether at least three average region ranging values among the ranging regions are within the preset range is determined.

12. The focus adjustment method according to claim 1, wherein the projection device only activates a part of the range-finding elements at a same time.

13. A focus adjustment method, adapted for a projection system, wherein the projection system comprises a projection target and a projection device having a range-finding array element and a processor, the range-finding array element is electrically connected to the processor, the range-finding array element comprises a plurality of range-finding elements and the range-finding elements respectively define a plurality of measurement mesh points on the projection target, and the focus adjustment method comprises:

defining a plurality of ranging regions from the measurement mesh points, wherein each of the ranging regions comprises more than one measurement mesh point;

enabling all the corresponding range-finding elements in the ranging regions to perform a ranging measurement on the projection target to generate a plurality of original ranging values;

performing an averaging calculation on the original ranging values corresponding to each of the ranging regions to generate a plurality of average region ranging values; and determining whether the average region ranging values are within a preset range to generate an optimal ranging value, and adjusting a lens focus of the projection device according to the optimal ranging value, wherein enabling all the corresponding range-finding elements in the ranging regions to perform the ranging measurement on the projection target to generate the original ranging values comprises:

selecting a part of the ranging regions among the ranging regions as a region to be measured;

enabling a plurality of transmitters corresponding to all the range-finding elements in the region to be measured to transmit a plurality of ranging signals to the projection target, wherein the transmitters transmit the ranging signals to the measurement mesh points corresponding to the range-finding elements on the projection target;

measuring a plurality of reflected ranging signals reflected by the projection target through a plurality of receivers corresponding to all the range-finding elements in the region to be measured; and inputting the reflected ranging signals into a lookup table to output the original ranging values corresponding to the reflected ranging signals, wherein there are respective preset angles between the connecting line of all the range-finding elements and a centerline of the range-finding array element, wherein the centerline is a connecting line between a central range-finding element of the range-finding array element and the corresponding measurement mesh point on the projection target.

14. A focus adjustment method, adapted for a projection system, wherein the projection system comprises a projection target and a projection device having a range-finding array element and a processor, the range-finding array element is electrically connected to the processor, the range-finding array element comprises a plurality of range-finding elements and the range-finding elements respectively define a plurality of measurement mesh points on the projection target, and the focus adjustment method comprises:

defining a plurality of ranging regions from the measurement mesh points, wherein each of the ranging regions comprises more than one measurement mesh point;

enabling all the corresponding range-finding elements in the ranging regions to perform a ranging measurement on the projection target to generate a plurality of original ranging values;

performing an averaging calculation on the original ranging values corresponding to each of the ranging regions to generate a plurality of average region ranging values; and determining whether the average region ranging values are within a preset range to generate an optimal ranging value, and adjusting a lens focus of the projection device according to the optimal ranging value, wherein determining whether the average region ranging values are within the preset range to generate the optimal ranging value comprises:

determining whether the average region ranging values are all within the preset range, wherein when the average region ranging values are all within the preset range, the average region ranging value of a central ranging region is taken as the optimal ranging value, wherein the central ranging region is at a center of the ranging regions, and when the average region ranging values are not all within the preset range, whether one or two average region ranging values among the average region ranging values are out of the preset range is determined, wherein the focus adjustment method further comprising:

when the one or two average region ranging values among the average region ranging values are out of the preset range, the ranging measurement and the averaging calculation are repeated on the ranging regions, and whether at least three average region ranging values among the ranging regions are within the preset range is determined, wherein the focus adjustment method further comprising:

when at least three average region ranging values of the ranging regions are all within the preset range, an average of the at least three average region ranging values of the ranging regions is taken as the optimal ranging value, and when the at least three average region ranging values of the ranging regions are not all within the preset range, the ranging measurement and the averaging calculation are repeated on a plurality of supplementary ranging regions that are not the ranging regions, and whether at least three average region ranging values of the central ranging region and the supplementary ranging regions are all within the preset range is determined.

15. The focus adjustment method according to claim 14, further comprising:

when the at least three average region ranging values of the central ranging region and the supplementary ranging regions are all within the preset range, an average of the at least three average region ranging values of the central ranging region and the supplementary ranging regions are taken and used as the optimal ranging value, and when more than three average region ranging values of the average region ranging values are out of the preset range or at least three average region ranging values of the central ranging region and the supplementary ranging regions are not all within the preset range, the ranging measurement and the averaging calculation are repeated on the ranging regions and the supplementary ranging regions, and whether a plurality of average region ranging values of the ranging regions and the supplementary ranging regions are increasing or decreasing toward a specific direction is determined.

16. The focus adjustment method according to claim 15, further comprising:

when the average region ranging values of the ranging regions and the supplementary ranging regions are increasing or decreasing toward the specific direction, an average of the average region ranging values corresponding to the specific direction is taken and used as a tentative ranging value, and the focus adjustment method is performed again, and when the average region ranging values of the ranging regions and the supplementary ranging regions are not increasing or decreasing toward the specific direction, the optimal ranging value and the tentative ranging value are not taken, and the focus adjustment method is performed again.

17. A focus adjustment method, adapted for a projection system, wherein the projection system comprises a projection target and a projection device having a range-finding array element and a processor, the range-finding array element is electrically connected to the processor, the range-finding array element comprises a plurality of range-finding elements and the range-finding elements respectively define a plurality of measurement mesh points on the projection target, and the focus adjustment method comprises:

defining a plurality of ranging regions from the measurement mesh points, wherein each of the ranging regions comprises more than one measurement mesh point;

enabling all the corresponding range-finding elements in the ranging regions to perform a ranging measurement on the projection target to generate a plurality of original ranging values;

performing an averaging calculation on the original ranging values corresponding to each of the ranging regions to generate a plurality of average region ranging values; and determining whether the average region ranging values are within a preset range to generate an optimal ranging value, and adjusting a lens focus of the projection device according to the optimal ranging value, wherein enabling all the corresponding range-finding elements in the ranging regions to perform the ranging measurement on the projection target to generate the original ranging values comprises:

selecting a part of the ranging regions among the ranging regions as a region to be measured;

enabling a plurality of transmitters corresponding to all the range-finding elements in the region to be measured to transmit a plurality of ranging signals to the projection target, wherein the transmitters transmit the ranging signals to the measurement mesh points corresponding to the range-finding elements on the projection target;

measuring a plurality of reflected ranging signals reflected by the projection target through a plurality of receivers corresponding to all the range-finding elements in the region to be measured; and inputting the reflected ranging signals into a lookup table to output the original ranging values corresponding to the reflected ranging signals, wherein performing the averaging calculation on the original ranging values corresponding to each of the ranging regions to generate the average region ranging values comprises:

taking a connecting line between a central range-finding element among the range-finding elements corresponding to each of the regions to be measured and a corresponding central measurement mesh point on the projection target as a region centerline;

determining that the region to be measured is a planar surface when a difference between a average region ranging value corresponding to each of the regions to be measured and the region centerline is less than a preset standard.

* * * * *